United States Patent
Roy (10) Patent No.: US 9,221,005 B2
(45) Date of Patent: Dec. 29, 2015

(54) SELF-REGULATING FILTRATION SYSTEM FOR WELD SMOKE

(71) Applicant: FREUDENBERG FILTRATION TECHNOLOGIES, LLC, Hopkinsville, KY (US)

(72) Inventor: Leon Roy, Etobicoke (CA)

(73) Assignee: FREUDENBERG FILTRATION TECHNOLOGIES, LLC, Hopkinsville, KY (US)

(*) Notice: Subject to any disclaimer, the term of this patent is extended or adjusted under 35 U.S.C. 154(b) by 0 days.

(21) Appl. No.: 13/919,882

(22) Filed: Jun. 17, 2013

(65) Prior Publication Data

US 2014/0366721 A1  Dec. 18, 2014

(51) Int. Cl.
- *B01D 46/44* (2006.01)
- *B08B 15/02* (2006.01)
- *F24F 3/16* (2006.01)

(52) U.S. Cl.
CPC ............ *B01D 46/446* (2013.01); *B01D 46/444* (2013.01); *B01D 2273/30* (2013.01); *B08B 15/02* (2013.01); *F24F 3/1607* (2013.01)

(58) Field of Classification Search
USPC .............. 55/385.1, 385.2, 356, 400, DIG. 34, 55/472, 473, 486; 95/277, 279, 25, 26; 96/424, 397, 417, 422, 421
See application file for complete search history.

(56) References Cited

U.S. PATENT DOCUMENTS

| | | | |
|---|---|---|---|
| 4,191,209 A * | 3/1980 | Mattson et al. | 137/486 |
| 4,312,291 A | 1/1982 | Knab | |
| 4,784,675 A * | 11/1988 | Leber et al. | 96/110 |
| 5,281,246 A * | 1/1994 | Ray et al. | 55/302 |
| 5,807,414 A | 9/1998 | Schaefer | |
| 5,810,908 A * | 9/1998 | Gray et al. | 95/25 |
| 5,954,848 A | 9/1999 | Otto et al. | |
| 6,290,740 B1 * | 9/2001 | Schaefer | 55/385.2 |
| 6,447,566 B1 | 9/2002 | Rivera et al. | |
| 6,547,860 B2 | 4/2003 | Buchwald et al. | |
| 6,660,070 B2 * | 12/2003 | Chung et al. | 96/424 |
| 6,736,016 B1 * | 5/2004 | Tong et al. | 73/861.52 |
| 7,288,130 B2 | 10/2007 | Tapper et al. | |

(Continued)

FOREIGN PATENT DOCUMENTS

| | | |
|---|---|---|
| EP | 0 798 051 | 6/1999 |
| WO | 01/34014 | 5/2001 |

OTHER PUBLICATIONS

International Search Report and Written Opinion from corresponding PCT Appln. No. PCT/US14/42471 dated Oct. 1, 2014.

(Continued)

*Primary Examiner* — Duane Smith
*Assistant Examiner* — Minh-Chau Pham
(74) *Attorney, Agent, or Firm* — Grossman, Tucker, Perreault & Pfleger, PLLC (57) ABSTRACT

A process and system for ventilation of welding smoke including an air passage configured to receive smoke from a welding environment, wherein said air passage has an inlet and an outlet and said inlet is positioned adjacent to said welding environment. The system also includes a filter coupled to the air passage, wherein the filter includes filter media that exhibits a burst strength of up to 20" w.g., an initial resistance in the range of 0.3" w.g. to 1.5" w.g., an air flow in the range of 1,000 cubic feet per minute to 2,500 cubic feet per minute and a removal efficiency of greater than 50% for particles having a diameter of 0.3 μm to 10.0 μm.

17 Claims, 6 Drawing Sheets

(56) References Cited

U.S. PATENT DOCUMENTS

| | | | |
|---|---|---|---|
| 8,186,230 B1* | 5/2012 | Kelley | 73/861.42 |
| 2003/0070544 A1* | 4/2003 | Mulvaney et al. | 95/25 |
| 2004/0185769 A1* | 9/2004 | Sung et al. | 454/187 |
| 2005/0024216 A1* | 2/2005 | Crooks et al. | 340/606 |
| 2005/0224069 A1* | 10/2005 | Patil et al. | 126/299 D |
| 2008/0083333 A1* | 4/2008 | Yokoi et al. | 95/277 |
| 2009/0113857 A1* | 5/2009 | Sithes | 55/293 |
| 2010/0202932 A1* | 8/2010 | Danville | 422/121 |
| 2012/0280489 A1* | 11/2012 | Bundy et al. | 285/91 |
| 2013/0062047 A1* | 3/2013 | Vaney et al. | 165/287 |
| 2013/0239814 A1* | 9/2013 | Ito et al. | 96/111 |
| 2014/0260552 A1* | 9/2014 | Morris et al. | 73/40 |

OTHER PUBLICATIONS

Viledon Product Catalogue 2013/2014. Product catalogue (online). Freudenberg Filtration Technologies SE & Co. KG. Jan. 2013.

* cited by examiner

SELF-REGULATING FILTRATION SYSTEM FOR WELD SMOKE

FIELD

The present disclosure relates to a self-regulating filtration system for weld smoke and other fumes. More specifically, the present invention provides a disposable filtration system for capturing and collecting particulate from a metal working environment where self-cleaning filtration has been previously utilized.

BACKGROUND

Welding is commonly used in industrial environments for the purposes of fabrication or assembly of metal components. However, welding fumes including gasses and particulate matter are typically emitted during the welding process. Gasses may include carbon monoxide, carbon dioxide, hydrogen fluoride, nitrogen oxides and ozone. Particulates are formed when the metal is heated, vaporizes and condenses into fine particles. In addition, oils and other metal working fluids as well as primer paints and plastics coating the workpiece may vaporize. Exposure to the gasses and particulate matter may result in metal fume fever as well as other adverse side effects such as irritation of the respiratory system and eyes and lead poisoning.

Local exhaust ventilation is used to remove and filter contaminated air. Various types of filters are incorporated into such ventilation systems and may be selected based on a variety of factors. One relatively important factor is the desired efficiency. The efficiency of a filter may be measured by a number of standards, including the minimum efficiency reporting value or MERV rating. However, eventually filters, regardless of their efficiency, become plugged. This leads to another factor in selecting filters, which is choosing either self-cleaning or disposable filters.

Self-cleaning cartridge filters can use dry compressed air to clean the filter. These filters may be relatively expensive. However, use of such systems with particulate that is not completely dry, including e.g., oil such as machine lubricants, can cause the filters to fail due to the inability to force release fluid laden particulate matter off the cartridge media, preventing reductions in static pressure desired in the cleaning process and maintenance of specified suction volumes. Disposable filters, with a life expectancy of a 1.5" w.g. increase in static pressure, require frequent changes as they quickly become plugged and fail. Accordingly, there remains a need for improvements in filters, wherein filtration requirements can be met and filter life spans are balanced with cost.

SUMMARY

In one aspect, the present disclosure relates to a system for ventilation of welding smoke. The system includes an air passage configured to receive smoke from a welding environment, wherein the air passage has an inlet and an outlet and the inlet is positioned adjacent to the welding environment. The system also includes a filter coupled to the air passage, wherein the filter comprises filter media that exhibits a burst strength of up to 20" w.g. The filter also exhibits a removal efficiency of greater than 50% for particles having a diameter of 0.3 μm or greater. Also, the filter exhibits an initial resistance in the range of 0.3" w.g. to 1.5" w.g. and an air flow in the range of 1,000 cubic feet per minute to 2,500 cubic feet per minute.

In another aspect, the present disclosure relates to a process for filtering welding smoke. The process includes generating welding smoke and drawing at least a portion of the welding fumes through a filter and reducing particulate matter in the welding smoke, wherein the filter comprises filter media that exhibits a burst strength of up to 20" w.g. The filter also exhibits a removal efficiency of greater than 50% for particles having a diameter of 0.3 μm or greater. Also, the filter exhibits an initial resistance in the range of 0.3" w.g. to 1.5" w.g. and an air flow in the range of 1,000 cubic feet per minute to 2,500 cubic feet per minute.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

The present disclosure relates to a disposable and self-regulating filtration system and process for filtration of weld smoke. The disposable filtration system herein provides an unexpectedly longer use life than previous disposable filters for the welding environment and provides a new option for those filtration systems which have relied upon self-cleaning filter cartridge designs. For example, it has been found that the present filter system for a welding application provides eight (8) times longer filter life than current conventional disposable filter/media employed in the welding environment.

Welding smoke is understood herein to indicate the by-products of welding that may become air-born in the welding environment. As noted above, the smoke may include gasses and particulate matter emitted during the welding process into the welding environment. Gasses include, for example, carbon monoxide, carbon dioxide, hydrogen fluoride, nitrogen oxides and ozone. Particulates may be formed when the metal is heated, vaporizes and condenses into fine particles. In addition, oils and other metal working fluids as well as primer paints and plastics coating the workpiece may vaporize. The welding environment may be understood as the area, or volume of air, in the vicinity of one or more welding machines. Welding smoke from the welding system penetrates into the welding environment by diffusion and other processes.

Figure 1:
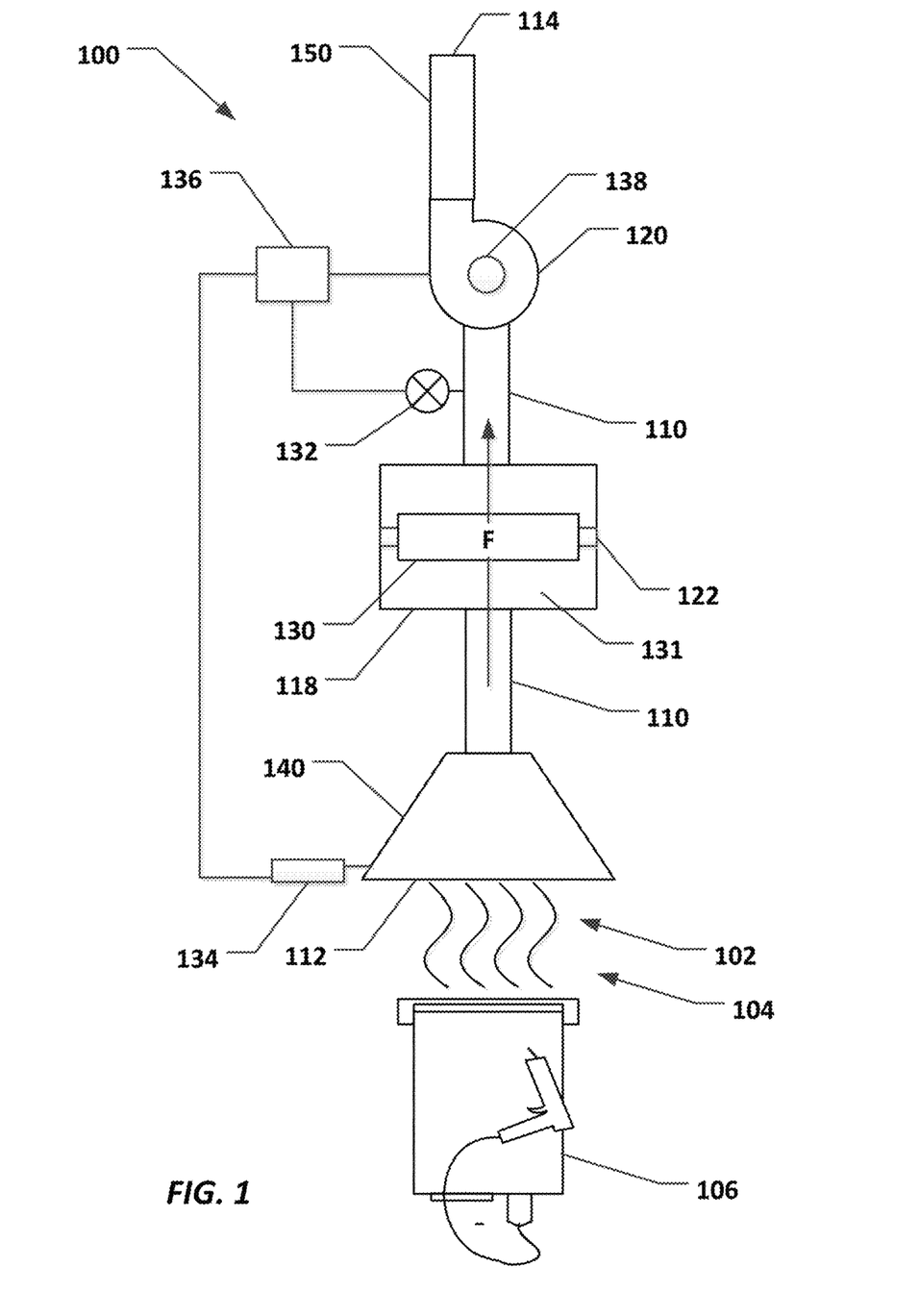
FIG. 1 illustrates an embodiment of a local exhaust ventilation system.

FIG. 1 illustrates an embodiment of a local exhaust ventilation system 100 for removing welding smoke 102 from a welding environment 104. The ventilation system 100 is illustrated as being positioned in the vicinity of the welding device 106. The ventilation system 100 includes an air passage 110, which may be constructed from one or more ducts and include a number of segments between an inlet 112 positioned near the welding environment 104 and an outlet 114. As illustrated, the air passage 110 directs the exhaust, i.e., welding smoke, into an air cleaning unit 118, and directs the treated air from the air cleaning unit 118. A fan 120 creates the pressure drop necessary to draw exhaust air into the inlet 112, through the air passage 110 and to the outlet 114.

The air cleaning unit 118 is coupled to the air passage 110, such that exhaust air may be directed into the air cleaning unit 118 for treatment, providing a fluid tight seal to prevent escape of any exhaust gasses. The air cleaning unit 118 provides, for example, frame work 122 or a drawer into which the one or more disposable filters 130 may be positioned and held so that the exhaust gas passes through the filter medium. The frame work 122 may provide the fluid tight seal around the filter to prevent leakage of exhaust gas around the filter 130. In embodiments, such as the illustrated embodiment, the filter cartridge holding the filter medium is positioned perpendicular to the direction of air flow F through the duct. Optionally, the cleaning unit may provide conduits for other optional components, such as a condenser or trap for capturing particulate matter.

A static pressure gauge 132 is positioned between the filters 130 and the fan 120, i.e., on the outlet side of the filter, to measure the static pressure applied to the filter 130. Alternative or additional pressure gauges may be placed at other locations in the system, such as between the inlet and the filter, i.e., the inlet side of the filter. As the filter 130 becomes clogged, the pressure draw at sensor 132 becomes greater, or more negative, as air is being removed from the system, but not flowing through the filter at the same rate as when the filter not as clogged.

In addition, an air velocity sensor 134 is provided to measure the velocity of the air flowing through the system. As illustrated, the air velocity sensor 134 is positioned near the inlet 112. Alternatively, or additionally, the air velocity sensor 134 may be positioned at other locations along the air passage. Assuming the horse power of the motor stays the same, as the filter becomes clogged, the air velocity of the exhaust through any given point in the system may decrease. Accordingly, to maintain a desired air velocity, as the filter clogs, it may be necessary to increase the horsepower of the fan motor 138.

In embodiments, a controller 136 may be provided that adjusts the horse power of the fan to maintain the air velocity at the inlet 112, while monitoring the outlet side static pressure at gauge 132 to prevent the filter from bursting. When the outlet side static pressure reaches a given set point, that is set below the burst strength of the filter, the system may provide a warning that the filter needs to be changed or shut down. The air velocity sensor 134 and static pressure gauge 132 are connected to the controller 136 via wiring or wireless communications.

The ventilation system may also include a hood 140. As illustrated, the hood 140, otherwise known as a canopy hood is positioned above the welding device 106. Alternatively, or additionally, the hood, otherwise known as a side draft hood, may be positioned to the side of the welding device 106. Side walls, either solid or flexible, may be positioned around the welding device to further prevent diffusion of welding smoke so as to create a chamber or cabin limiting the potential size of the welding environment. Accordingly, the hoods may be enclosing hoods, external hoods, or receiving hoods. The ventilation system may also include a stack 150 for expelling the treated exhaust to the outside of the building. Treated exhaust air may also, or alternatively be recycled back into the welding environment.

Other configurations of the ventilation system may be provided as well, including additional filtration, heating or cooling devices, spark traps, etc. For example, various baffles may be provided in the system to direct air flow. In addition, multiple local exhaust systems may be tied together reducing allowing for the reduction in some duplicate components. For example, multiple inlets may feed into a single air cleaning unit.

Figure 2:
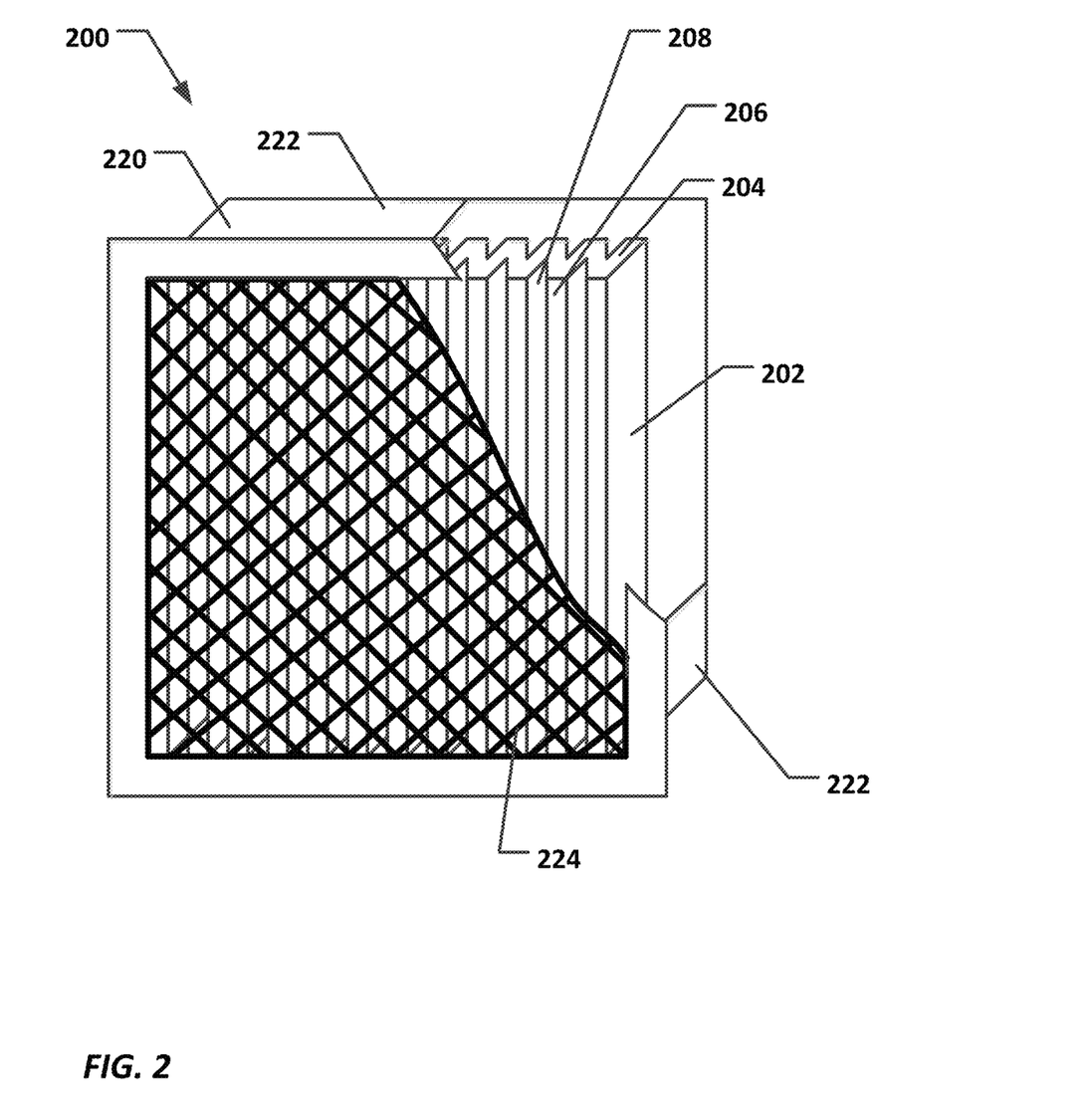
FIG. 2 illustrates an embodiment of a filter.

FIG. 2 illustrates an example of filter 200 for use with the air filtration systems described herein. The filter includes media 202 that traps weld smoke and, in particular, metal particulates emitted during the welding process into the welding environment. The filter media may include one or more layers of woven fibers, nonwoven fibers or perforated films.

In particular, the filter media may include nonwoven material, including one or more of glass, carbon, or polymeric fibers. In embodiments, the media may be electrostatically charged. Binder materials may be incorporated as fibers or particles into the filter media. Furthermore, the filter media may be embossed to increase the surface area of the filter media. Embossing the filter media may also activate any binder present within the filter media and may be used to join fibers together of one or more layers.

The filter media may be formed into a plurality of pleats 204, as illustrated, wherein the filter media exhibits a plurality of peaks 206 and valleys 208, increasing the surface area of the filter media. Where multiple layers of filter media are present, each layer may be separately pleated and stacked with an offset between the layers such as to provide spacing between the filter layers. Or, the layers may be stacked and pleated together, wherein an offset is not present between the layers.

Figure 3A:
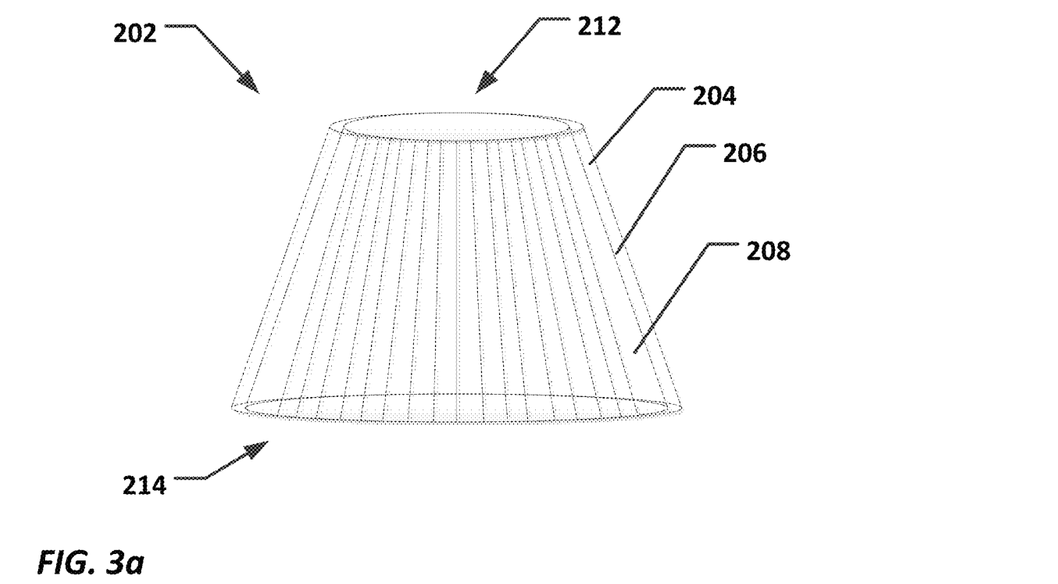
FIG. 3a illustrates a side view of an embodiment of a filter.
Figure 3B:
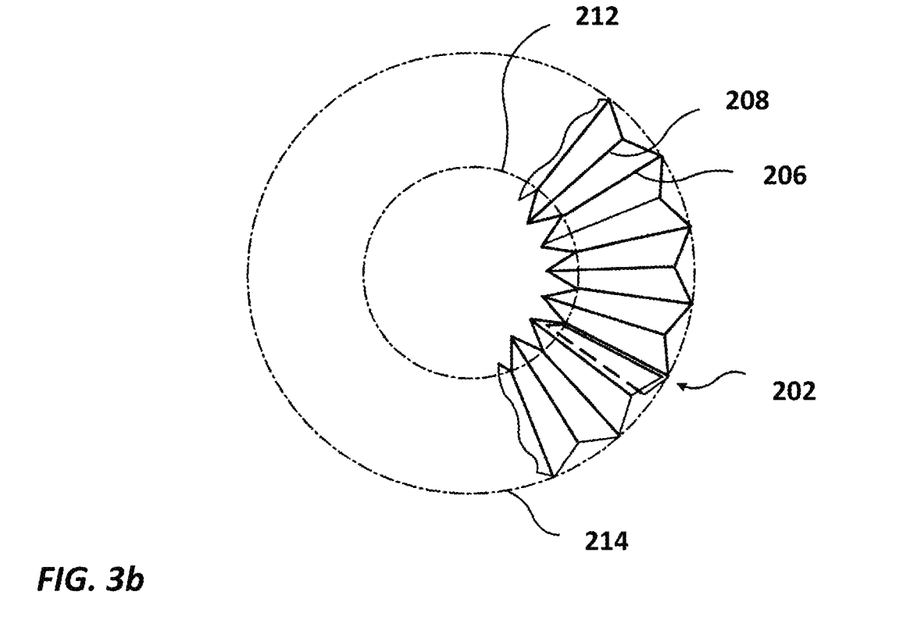
FIG. 3b illustrates a top view of an embodiment of a filter.

Furthermore, the pleated filter media may be arranged in a conical geometry as illustrated in FIGS. 3*a* and 3*b*, a side and top view of such a conical filter. As illustrated in the figures, the filter may taper such that a first end of the filter 212 exhibits a first diameter that is relatively smaller than a second diameter exhibited by the second end of the filter 214. Alternatively, or additionally, the filter media may be formed into a honeycomb structure, wherein each cell exhibits three or more walls, such as four walls, six walls or eight walls.

In embodiments, the filter media traps particulates that are less than or equal to 10 µm, such as in the range of 0.3 µm to 10 µm. More preferably, the media traps particles in the range of 3.0 microns to 10.0 microns, or 1.0 microns to 10 microns, and as noted, 0.3 microns to 10 microns. The filter media may also exhibit a minimum efficiency reporting value of 9 or greater, and preferably 13 or greater and more preferably 14 or greater, and more preferably 15 or greater, 16 or greater, 17 or greater, 18 or greater, 19 or greater and up to 20. The minimum efficiency reporting value, or MERV, is determined by the American Society of Heating, Refrigerating and Air-Conditioning Engineers (ASHRAE) standard IC 52.2-2007.

The filter also exhibits a removal efficiency of greater than 50% for particles having a diameter (or largest linear dimension) of 0.3 µm or greater, as measured by the above referenced ASHRAE standard. The filter may also exhibit a removal efficiency of over 90% for particles having a diameter (or largest linear dimension) of 1.0 µm or greater. In preferred embodiments the filter exhibits an operating efficiency of no less than 99% at particle size diameter of 0.35 µm or greater.

In addition, the rated air flow of the filter may be in the range of 1,000 cubic feet per minute to 2,500 cubic feet per minute, including all values and increments therein, such as 1,800 to 2,200 cubic feet per minute, 1,900 to 2,100 cubic feet per minute, etc. The filter may also exhibit an initial resistance, i.e., a resistance before loading, of 0.3" w.g. to 1.5" w.g., including all values and ranges therein, such as 0.37"

w.g. An example of such filter includes the MX95 filter available from FREUDENBERG FILTRATION TECHNOLOGYS LP.

Where more than one layer of filter media is present the filter media may be arranged so as to form a gradient. In embodiments, a first layer of media, such as the filtration media closest to the inlet (see item 131 of FIG. 1) of the filter, traps particulate of relatively higher particle size than a second layer of media, which therefore traps particulate of relatively lower particle size. Similarly, if a third layer of filtration media is present, the third layer may be configured to trap particulate of relatively lower particle size than that of the second layer of filtration media, etc. For example, the first layer of filtration media may trap particles having a diameter of greater than 10 microns, and a second layer may trap particles having a diameter of 10 microns or less.

However, in other embodiments, the first layer of filtration media may trap particles having a diameter of greater than or equal to 0.3 microns, 1.0 microns, 3.0 microns, etc. Where more than two layers are present, the filtration profile may be linear, such that subsequent layers of filtration media collect particles that are smaller than particles trapped by previous layers. Such arrangement provides a linear dust loading. Without being bound to any particular theory, it is believed that this arrangement allows for the extension of the filter performance.

In embodiments, the filter media, and therefore the filter, withstands the application of a static pressure, or a burst strength, of up to 20 inches of water gauge, i.e., 20" w.g. This allows the system to start with a relatively low static pressure, e.g., 0.37" w.g. and as the filter is loaded with particulate, and other matter, additional static pressure up to 20" w.g. may be applied to the filter media without the filter media bursting. Additional pressure may be applied, for example, by increasing the horse power of the fan used to move the exhaust through the system.

Referring again to FIG. 2, as illustrated, the filter 200 is arranged in a cassette 220, i.e., a filter including one or more coverings, such as side braces 222, front grids 224 and back grids (not illustrated for purposes of clarity). The covering may aid in securing the filter into the air passage, provide support to the filter to prevent the filter from tearing, or both.

Figure 4:
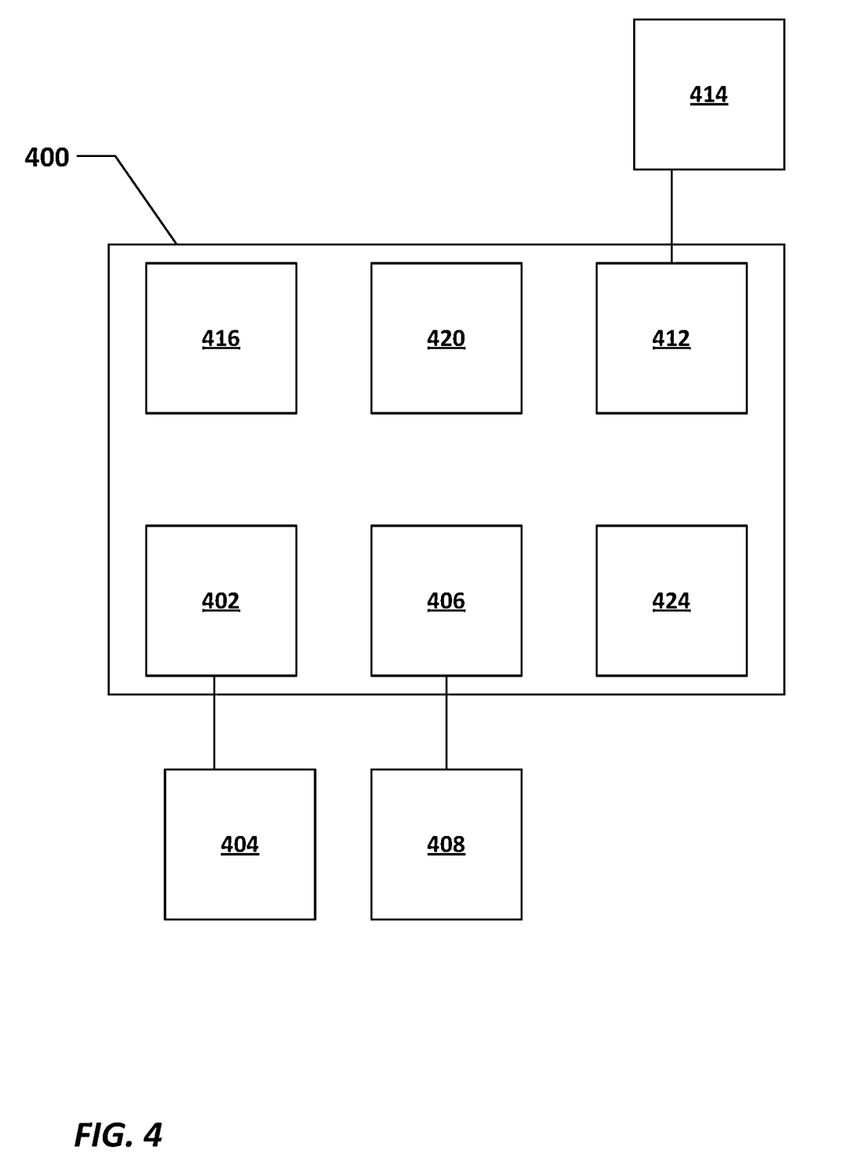
FIG. 4 illustrates an embodiment of a controller.

FIG. 4 illustrates an embodiment of a controller 400 for use in the system herein. The controller may include a number of inputs and outputs. For example, a first input 402 may be connected to a static pressure sensor 404 and a second input 406 may be connected to an air velocity sensor 408. Additional inputs may be provided to connect to keypads, keyboards, pointing devices, switches, etc. For example, an additional input may include a sensor that detects when the welding device is on. In addition, a first output 412 may be connected to the fan motor 414. Additional outputs may be provided to connect to printers or display devices, including segment displays or two dimensional displays, such as monitors. In embodiments, the input and output devices may also include transceivers, receivers, transmitters or combinations thereof 416 to provide communication via various protocols and standards, such as BLUETOOTH, WI-FI IEEE 802.11, etc.

The controller may also include a processor including one or more processors for performing various calculations, including comparisons of the sensor outputs to stored values. The processor may include a central processing unit, microprocessor, application-specific instruction set processor, etc. In embodiments, processors are dedicated to specific tasks, such as an application processor, communication processor, signal processors, etc. Additionally, in embodiments processing is accomplished, shared, or distributed between one or more processors. For example, an application processor may manage not only applications, but also BLUETOOTH and WI-FI communications.

Memory 420 includes read only memory (ROM) and random access memory (RAM) in the form of one or more memory structures present in the system. Memory structures include, for example, NAND, SRAM, SDRAM, etc. In embodiments, memory is used to store the operating system, various applications, application framework or middleware, optional program modules, stored values, etc. Memory is also used as a buffer to store the capture sensor data prior to processing or after processing.

A power supply 424 is also provided. The power supply includes, for example, one or more of a battery, a photovoltaic cell or a power supply cable as well as corresponding interfaces. Additionally, in embodiments, various transformers, alternating current to digital current converters, and other power management devices as well as, optionally, a power management processor are provided.

Also provided herein are methods for adjusting the fan motor horsepower based upon the airflow or static pressure on the filter. Any of the methods described herein may be implemented or executed in a system including a controller such as the system and controller described above. Other embodiments may be implemented as software modules executed by a programmable control device.

Figure 5A:
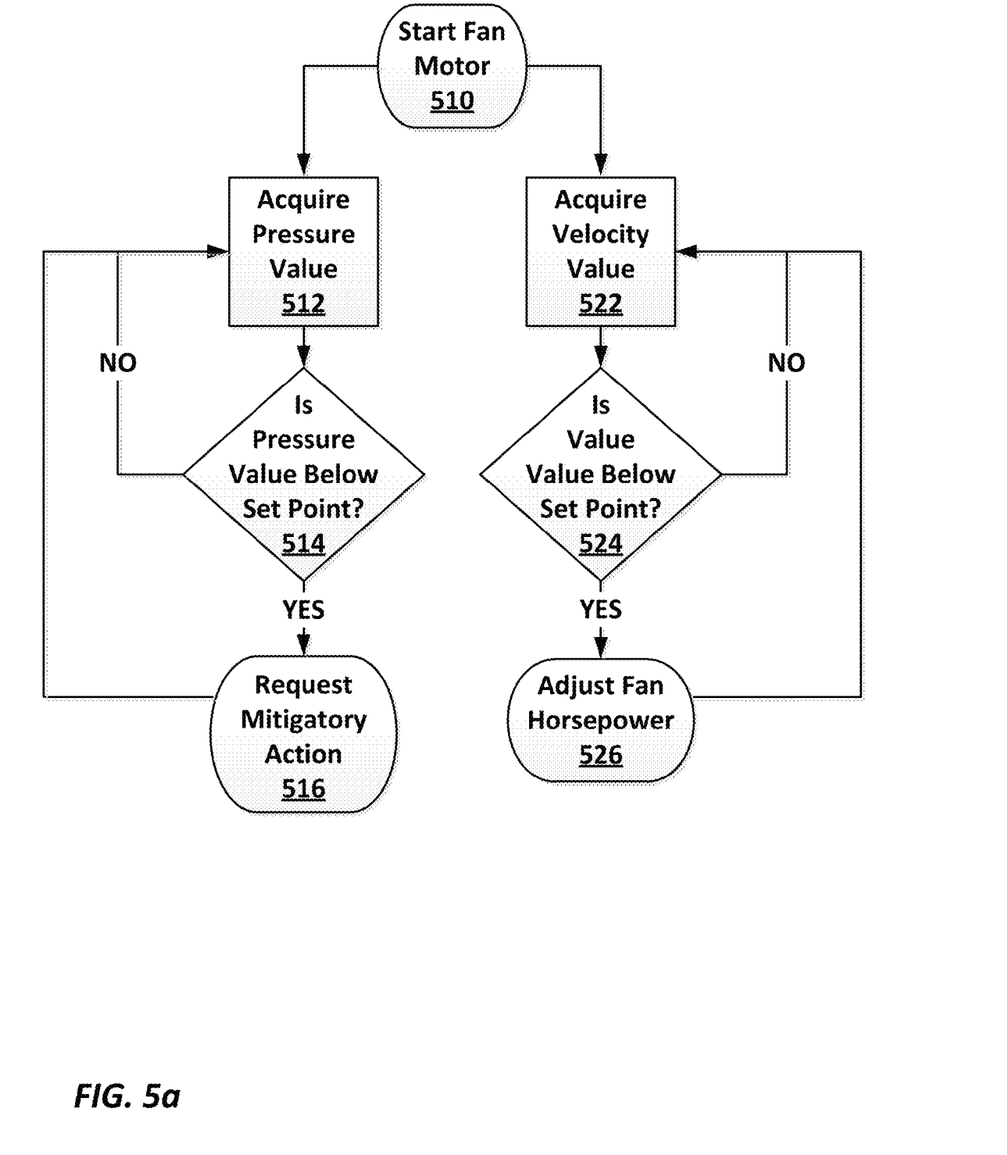
FIG. 5a illustrates an embodiment of a method for exhausting weld smoke from a welding environment.

Illustrated in FIG. 5a is a method 500 for controlling the fan motor to draw weld smoke from a welding environment. The method may generally begin starting the fan motor 510 either before the welding process begins, when the welding process begins or after the welding process begins 510. In embodiments, a sensor detecting gasses or particulate matter may be provided and when the gasses or particulate reach a specific concentration, the fan motor may be switched on.

The system may then monitor the difference in static pressure from a set point that is below the filter burst pressure. A static pressure value on the outlet side of the filter is acquired 512 using the static pressure sensor located on the outlet side of the filter. This value is then compared with the set point value and a determination is made as to whether the static pressure is below the set point value 514. If the static pressure is below the set point value, then the measurement process is repeated after a given interval, if it the static pressure value is at or above the set point value, then a mitigatory action is taken such as activating a warning signal or shutting the system down 516.

In addition, the air velocity in the air passage is acquired 522 using the air velocity sensor. The air velocity value is compared to that of an air velocity set point 524, wherein below the set point an inadequate amount of exhaust is drawn from the welding environment. If the air velocity is above the set point, then the measurement process is repeated after a given interval and if the air velocity is below the set point, then the horsepower of the fan is adjusted 526, by increasing the horsepower, and the process is repeated until the desired air velocity set point is reached.

Figure 5B:
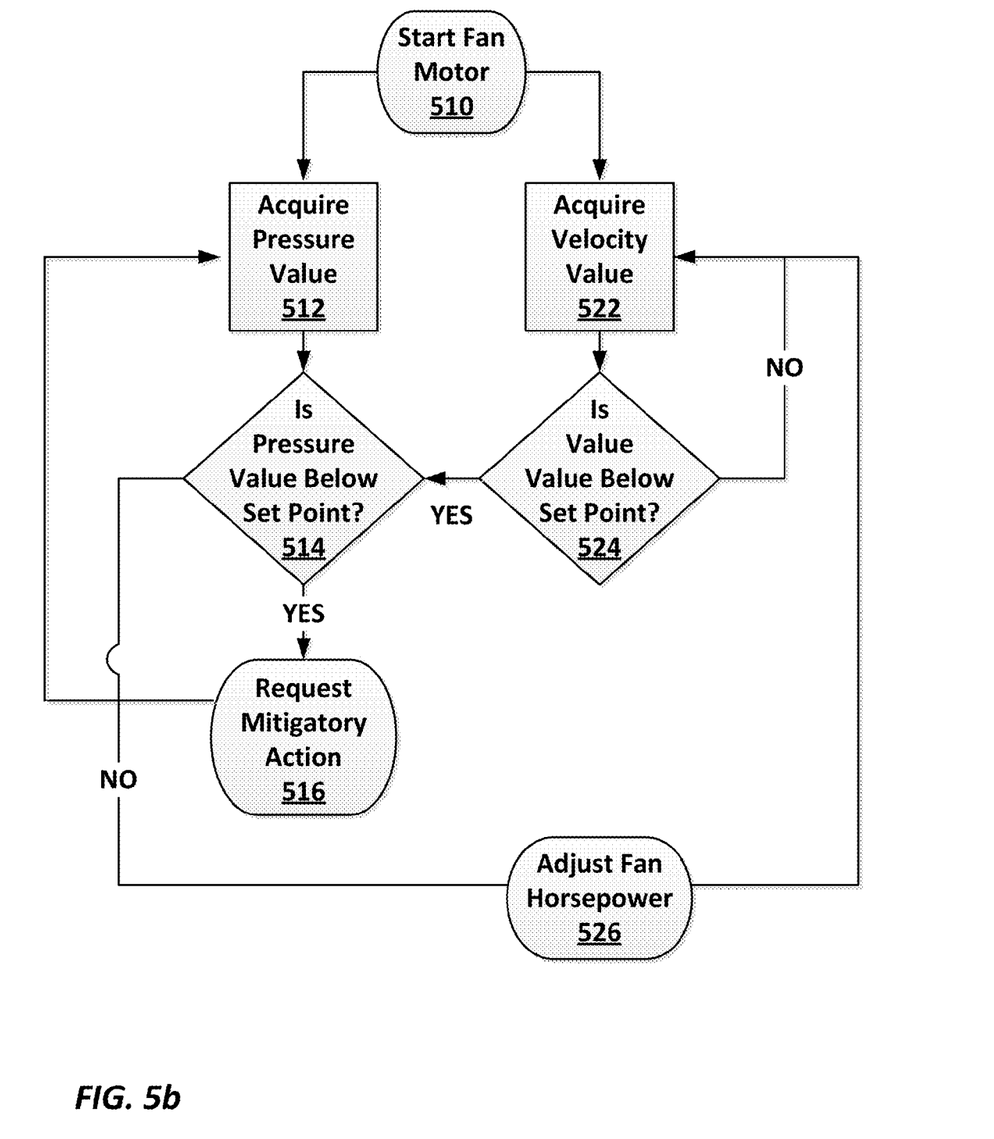
FIG. 5b illustrates an embodiment of a method for exhausting weld smoke from a welding environment.

In addition, as illustrated in FIG. 5b, the process 500 may be similar to that described above, except prior to adjusting the fan horsepower to a greater level, a determination may be made that the measured static pressure value is below the set point. If the measured static pressure value is below the set point at 514, then the fan horsepower may be adjusted to achieve the desired velocity value. If the measured static pressure value is below the set point at 514 then a mitagatory action is requested and the fan horsepower is not adjusted or it is lowered, to prevent the filter from bursting.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A process for filtering welding smoke, comprising:
drawing welding smoke with a fan into an air passage and through a filter coupled to said air passage;
reducing particulate matter in said welding smoke;
measuring a static pressure on an outlet side of said filter;
measuring an air velocity in said air passage; and
adjusting the horsepower of the fan;
wherein:
said filter comprises filter media that exhibits a burst strength of up to 20" w.g., an initial resistance in the range of 0.3" w.g. to 1.5" w.g., an air flow in the range of 1,000 cubic feet per minute to 2,500 cubic feet per minute and a removal efficiency of greater than 50% for particles having a diameter of 0.3 μm or greater; and
adjusting the horsepower of the fan is limited by a measured static pressure obtained by said measuring of said static pressure, so as to prevent bursting of said filter media.

2. The process of claim 1, wherein adjusting the horsepower of said fan is based on said measuring of said air velocity in said air passage.

3. The process of claim 1, wherein measuring said static pressure is performed in said air passage between said filter and said fan.

4. The process of claim 2, further comprising:
comparing a measured air velocity to an air velocity set point and when said measured air velocity is lower than said air velocity set point, increasing said horsepower.

5. The process of claim 4, further comprising:
comparing said measured static pressure to a static pressure set point; and
when said measured air velocity is lower than said air velocity set point and said measured static pressure is lower than said static pressure set point, increasing said horsepower.

6. A system for ventilation of welding smoke, comprising:
an air passage configured to receive welding smoke from a welding environment, wherein said air passage has an inlet and an outlet and said inlet is positioned adjacent to said welding environment;
an air velocity sensor coupled to said air passage;
a filter coupled to said air passage;
a fan coupled to said air passage, the fan configured to draw said welding smoke into said air passage and through said filter;
an air static pressure gauge coupled to said air passage on an outlet side of said filter; and
a controller coupled to said air velocity sensor, said static pressure sensor, and said fan;
wherein:
said filter comprises filter media that exhibits a burst strength of up to 20" w.g., an initial resistance in the range of 0.3" w.g. to 1.5" w.g., an air flow in the range of 1,000 cubic feet per minute to 2,500 cubic feet per minute and a removal efficiency of greater than 50% for particles having a diameter of 0.3 μm or greater;
said controller is to adjust the horsepower of the fan; and
said controller is further to limit the adjustment of the horsepower of said fan based on a static pressure measurement taken by said air static pressure gauge, so as to prevent bursting of said filter media.

7. The system of claim 6, wherein said filter exhibits a filtration efficiency of at least MERV 13.

8. The system of claim 6, wherein said filter includes a first and second layer, wherein said filter traps particulates of relatively high particles sizes in a first layer and relatively lower particles sizes in a second layer.

9. The system of claim 6, wherein said controller is further to adjust the horsepower of said fan based on a measurement provided by said air velocity sensor.

10. The system of claim 9, wherein:
the measurement provided by the air velocity sensory is a measured air velocity;
the controller is further configured to compare the measured air velocity to an air velocity set point; and
when the measured air velocity is lower than said air velocity set point, the controller increases the horsepower of said fan.

11. The system of claim 10, wherein:
said air velocity sensor is further coupled to said air passage between said filter and said fan.

12. The system of claim 10, wherein said controller is further configured to:
compare a measured static pressure provided by said air static pressure gauge to a static pressure set point; and
increase said horsepower when said measured air velocity is lower than said air velocity set point and said measured static pressure is lower than said static pressure set point.

13. The system of claim 6, wherein said air passage inlet includes a hood.

14. The process of claim 5, wherein said static pressure set point is less than or equal to the burst strength of said filter media.

15. The process of claim 14, further comprising:
preventing an increase to said horsepower when said measured static pressure is greater than or equal to said static pressure setpoint.

16. The system of claim 12, wherein said static pressure set point is less than equal to the burst strength of said filter media.

17. The system of claim 16, wherein the controller is further configured to prevent an increase to said horsepower when said measured static pressure is greater than or equal to said static pressure set point.

* * * * *